United States Patent
Stephan et al.

(10) Patent No.: US 10,845,257 B2
(45) Date of Patent: Nov. 24, 2020

(54) DEVICE AND METHOD FOR SENSING TORQUES, TORSIONAL NATURAL FREQUENCIES, AND/OR TORSIONAL OSCILLATIONS WITHOUT CONTACT

(71) Applicant: BASF SE, Ludwigshafen am Rhein (DE)

(72) Inventors: Oskar Stephan, Hockenheim (DE); Roland Schuhmann, Bensheim (DE); Tom Catternan, Geismar, LA (US)

(73) Assignee: BASF SE, Ludwigshafen (DE)

( * ) Notice: Subject to any disclaimer, the term of this patent is extended or adjusted under 35 U.S.C. 154(b) by 99 days.

(21) Appl. No.: 15/770,791

(22) PCT Filed: Nov. 2, 2016

(86) PCT No.: PCT/EP2016/076380
§ 371 (c)(1),
(2) Date: Apr. 25, 2018

(87) PCT Pub. No.: WO2017/076876
PCT Pub. Date: May 11, 2017

(65) Prior Publication Data
US 2018/0306654 A1  Oct. 25, 2018

(30) Foreign Application Priority Data
Nov. 3, 2015 (EP) .................... 15192697

(51) Int. Cl.
*G01L 1/12* (2006.01)
*G01L 3/10* (2006.01)

(52) U.S. Cl.
CPC .............. *G01L 1/125* (2013.01); *G01L 1/127* (2013.01); *G01L 3/102* (2013.01); *G01L 3/103* (2013.01); *G01L 3/105* (2013.01)

(58) Field of Classification Search
CPC ......... G01L 1/125; G01L 3/102; G01L 3/103; G01L 3/105; G01L 1/127
See application file for complete search history.

(56) References Cited

U.S. PATENT DOCUMENTS

| 4,566,338 A | 1/1986 | Fleming et al. |
| 7,540,204 B2 * | 6/2009 | Harata ................ G01L 3/102 |
| | | 73/862.331 |

(Continued)

FOREIGN PATENT DOCUMENTS

| EP | 0087002 A2 | 8/1983 |
| EP | 2202499 A2 | 6/2010 |

(Continued)

OTHER PUBLICATIONS

International Application No. PCT/EP2016/076380, International Search Report and Written Opinion, dated Mar. 16, 2017.

*Primary Examiner* — Freddie Kirkland, III
(74) *Attorney, Agent, or Firm* — Marshall, Gerstein & Borun LLP

(57) ABSTRACT

The invention relates to a device (14) and to a method for the contactless detection of a torque of a shaft (10) and/or torsional natural frequencies and/or torsional oscillations. The shaft (10) contains a ferromagnetic material. A measurement head (16) facing toward a shaft wall (12) comprises an excitation coil (22) which couples a magnetic field into the shaft (10). The measurement head (16) furthermore contains a number of measurement coils (24, 26, 28, 30), which measure the magnetic field emerging from the shaft (10).

14 Claims, 3 Drawing Sheets

(56) References Cited

U.S. PATENT DOCUMENTS

| | | | |
|---|---|---|---|
| 9,134,188 B2* | 9/2015 | May | G01L 1/127 |
| 9,212,958 B2* | 12/2015 | Campbell | G01L 1/122 |
| 9,233,709 B2* | 1/2016 | Ishii | B62D 5/0403 |
| 9,234,811 B2* | 1/2016 | Brummel | G01L 3/105 |
| 9,476,691 B2* | 10/2016 | May | G01D 5/145 |
| 9,714,877 B2* | 7/2017 | Nakamura | G01L 3/103 |
| 9,909,938 B2* | 3/2018 | Brummel | G01N 27/902 |
| 9,983,075 B2* | 5/2018 | Nakamura | G01L 3/102 |
| 10,185,021 B2* | 1/2019 | Folkner | G01R 35/005 |
| 10,345,167 B2* | 7/2019 | Lu | G01L 25/003 |
| 2007/0074588 A1* | 4/2007 | Harata | G01L 3/102 |
| | | | 73/862.331 |
| 2011/0193552 A1 | 8/2011 | Fulkerson et al. | |
| 2014/0102220 A1 | 4/2014 | Brummel et al. | |
| 2014/0184210 A1 | 7/2014 | Campbell et al. | |
| 2015/0298725 A1* | 10/2015 | Kichikawa | B62D 5/0403 |
| | | | 180/446 |
| 2016/0195438 A1 | 7/2016 | Brummel et al. | |
| 2017/0284877 A1* | 10/2017 | Nakamura | G01L 3/102 |

FOREIGN PATENT DOCUMENTS

| | | |
|---|---|---|
| EP | 2549255 A2 | 1/2013 |
| JP | S58151533 A | 9/1983 |
| JP | S60145339 U | 9/1985 |
| JP | S60244828 A | 12/1985 |
| JP | H6241924 A | 9/1994 |
| JP | H0763627 A | 3/1995 |
| JP | 2013-519882 A | 5/2013 |
| WO | WO-2015/032638 A1 | 3/2015 |
| WO | WO-2015/132123 A1 | 9/2015 |

* cited by examiner

DEVICE AND METHOD FOR SENSING TORQUES, TORSIONAL NATURAL FREQUENCIES, AND/OR TORSIONAL OSCILLATIONS WITHOUT CONTACT

CROSS-REFERENCE TO RELATED APPLICATIONS

This is the U.S. national phase of International Application No. PCT/EP2016/076380, filed Nov. 2, 2016, which claims the benefit of European Patent Application No. EP 15192697.9, filed Nov. 3, 2015.

The invention relates to an inductive sensor which is suitable for the contactless measurement of torques, torsional natural frequencies and torsional oscillations. The invention furthermore relates to a method for the contactless detection of torques, torsional natural frequencies and torsional oscillations on shafts, whether hollow shafts or solid-material shafts, which are either made of ferromagnetic material or contain a material having ferromagnetic properties.

For contactless torque detection, particularly in the case of ferromagnetic materials, the anisotropic magnetostrictive effect may be used. In this case, use is made of the fact that, in these materials, the permeability is different in the tension and compression directions—for example in the event of a torsional load. By means of a contactless sensor, it is possible to measure these differences, which vary proportionally to the surface stress or the torque stressing the shaft within a wide measurement range.

The object of the invention is to provide a device with which it is possible to detect the torque which is applied to a shaft, for example in mixers, stirrers, paddle dryers and the like with and which the shaft can consequently be mechanically stressed.

According to the invention, a device for the contactless detection of torques, of torsional natural frequencies and of torsional oscillations on a shaft is provided, the shaft being made of a material having ferromagnetic properties or comprising such a material. A measurement head facing toward a shaft wall of this shaft comprises an excitation coil which couples a magnetic field into the shaft, the measurement head furthermore containing a number of measurement coils, which measure a magnetic field emerging from the shaft through the shaft wall.

Besides the advantage of a contactless measurement, the solution according to the invention offers the further advantage that, by such a device, a measurement signal is obtained which is proportional to the surface stresses of the shaft material as well as to the torque of the shaft in a relatively wide measurement range. The frequency and the strength of the magnetic field are selected in such a way that the measurement signal obtained varies linearly over a large frequency range, and magnetic saturation is not in fact achieved for most known ferromagnetic materials. The frequency is of the order of from 80 kHz to 120 kHz, for example 100 kHz.

Advantageously, the device provided according to the invention comprises a measurement head which comprises a plurality of measurement coils. In a particularly preferred embodiment, the measurement head comprises four measurement coils, which are respectively arranged symmetrically with respect to one another. Preferably, the number of measurement coils can be positioned in relation to one another at a 45° angle to the main axes of the shaft.

The measurement head, on which both the excitation coil and the number of measurement coils are located, is arranged at a distance from the shaft wall of the shaft. This distance, which is referred to as an air gap, lies between 0.5 mm and 1 mm, and is preferably of the order of 0.75 mm. A deviation of the distance from the preferred value of 0.75 mm and +/−0.25 mm influences the measurement only insubstantially.

In an advantageous possible embodiment of the device provided according to the invention, the measurement head is made of PEEK. The excitation coil in the measurement head of the device provided according to the invention is operated with an excitation frequency of between 50 kHz and 150 kHz, preferably between 75 kHz and 125 kHz, and particularly preferably of the order of 100 kHz. This makes it possible to detect rapid dynamic changes in the torque independently of the rotational frequency of the shaft.

Particularly advantageous is a horizontal mounting position of the device in a plane which is spanned by the longitudinal axis of the shaft and the longitudinal axis of a rotationally symmetrically configured housing of the device. In such a mounting position, optimal measurement results can be achieved.

In order to fasten the sensor at precisely that distance relative to the shaft wall of the shaft, whether the latter is configured as a hollow shaft or if it is a solid-material shaft, the housing of the device may be enclosed by a first sensor holder. The first sensor holder is formed in particular from separately configured half-shells and encloses the housing of the sensor. It is furthermore possible, for example, to fasten the sensor on the housing or on the root of the measurement head by means of a second sensor holder configured as an angle plate, and to ensure that the distance between the measurement head and the coils contained therein and the shaft wall of the shaft remains constant while the contactless detection is being carried out.

In order to achieve the best possible measurement results, the distance of all coils contained in the measurement head relative to the shaft wall of the shaft is equal. The coils contained in the measurement head generate a voltage, the lower limit of which corresponds to a voltage which occurs for a minimum torsional load of the shaft of the order of 10 newtons/mm$^2$. In relation to the excitation coil, which is contained centrally in the measurement head, all measurement coils arranged in the cylindrically configured measurement head lie at the same radial distance relative to the excitation coil. The measurement head per se is located at a short distance, of the order of a few millimeters, preferably at a distance of 0.75 mm, relative to the shaft wall of the shaft whose torsional stress is to be measured.

Preferably, both the excitation coil and the measurement coils arranged on the circumference of the measurement head are embedded in a plastic material, for example PEEK. The measurement head has a cylindrical appearance and a diameter of about 20 mm.

The invention furthermore relates to a method for the contactless detection of torques of a shaft and/or of torsional natural frequencies and/or of torsional oscillations with a device according to the invention, an excitation coil of the device coupling a magnetic field into the shaft and a number of measurement coils measuring a magnetic field emerging from the shaft, and a sum of all voltages at the measurement coils being measured.

A direction of a detected torque may be determined from the sign of the voltage differences between the individual measurement coils of the number of measurement coils.

By the method provided according to the invention, surface stresses proportional to the torque which acts on the shaft are measured in the shaft wall of the shaft. In this case, a torque detection may be carried out for shafts which preferably have a diameter of at least 35 mm.

According to the method provided according to the invention, in particular, a magnetic field which includes a frequency range of between 80 kHz and 100 kHz within which a linear measurement signal can be generated, i.e. for example 100 kHz, in terms of frequency and magnetic field strength is coupled into the shaft.

As the output signal, the device provided according to the invention delivers an electric current of the order of between 4 mA and 20 mA, which is converted into torque values. The supply voltage of the excitation coil of the device for the contactless detection of torques, torsional natural frequencies and torsional oscillations is preferably 24 V.

For the calibration of the device, contactless detection of torques is carried out by means of the device provided according to the invention. To this end, the device as well as the associated software are calibrated individually for each shaft, stationary measurements at two known load points being carried out for this purpose. The quality of the calibration significantly influences the quality of the measurement obtained. The device provided according to the invention may be used to determine torsional natural frequencies and said torsional oscillations without carrying out such a calibration.

With the device provided according to the invention, the surface stresses, proportional to the individual torque, of ferromagnetic drive shafts—to give an example—are measured. The resulting measurement signal of the device is influenced by the magnetic properties of the shaft material used as well as by the order of magnitude of the magnetostriction or existing material inhomogeneities. Even in the event of large material inhomogeneities, in the case of loads which lead to a surface stress of more than 10 newtons/mm$^2$, good measurement results can be obtained with careful calibration.

The invention will be described in more detail below with the aid of the drawing, in which.

Figure 1:
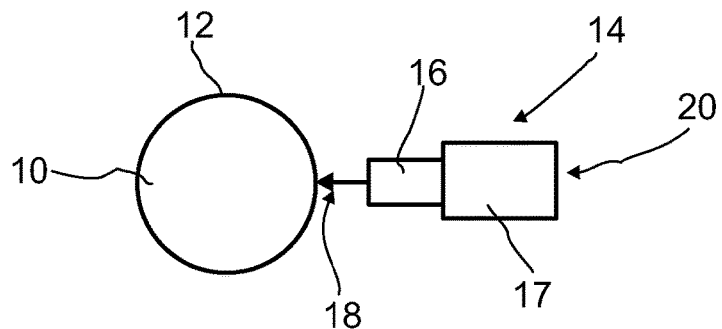
FIG. 1 shows the positioning of the device.

The representation according to FIG. 1 reveals the positioning of the device provided according to the invention, particularly in the configuration of a sensor.

A shaft 10, which is made as a solid-material shaft or as a hollow shaft, has a shaft wall 12. Opposite the latter in the horizontal direction 18, there is the device 14 provided according to the invention, preferably configured as a sensor. In relation to its longitudinal axis, the sensor 14 lies in a plane which is spanned by the longitudinal axis of a housing 17 of the sensor 14 and the longitudinal axis of the shaft 10 perpendicularly to the plane of the drawing. A preferred mounting position 20 of the sensor 14 is represented in the representation according to FIG. 1. On the housing 17 of the sensor 14, at the front end, there is a measurement head 16 which is positioned at a distance—which will be discussed in more detail below—from the shaft wall 12 of the shaft 10.

Figure 2:
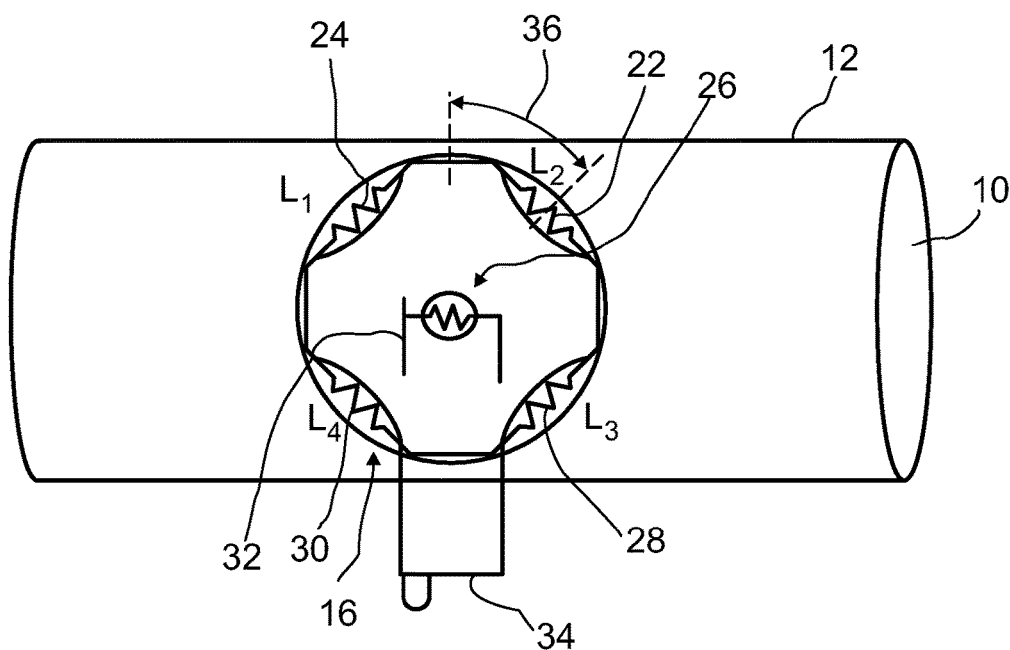
FIG. 2 shows positioning of the coils on the measurement head.

FIG. 2 shows the position of coils on the measurement head of the sensor according to the schematic representation according to FIG. 1.

FIG. 2 reveals that there is an excitation coil 22 on the measurement head 16, approximately at the center of the latter. The excitation coil 22 is excited with an excitation frequency of between 50 kHz and 150 kHz, preferably between 75 kHz and 125 kHz, and particularly preferably of the order of 100 kHz. This makes it possible to detect rapid dynamic changes in the torque—independently of the rotational frequency of the shaft 10. The magnetic field coupled into the shaft 10 by the excitation coil 22 is selected in such a way that a measurement signal is linear over a large frequency range, and magnetic saturation is not reached for most known materials having ferromagnetic properties; in particular, the frequency range lies between 80 kHz and 120 kHz, and a frequency of 100 kHz may for example be selected.

According to the representation in FIG. 2, an input voltage 32 $U_{in}$ which is of the order of 24 V is applied to the excitation coil. Around the circumference of the measurement head 16, which is preferably made of a material such as for example PEEK, there are a number of measurement coils 24, 26, 28, 30. The measurement coils 24, 26, 28, 30 deliver an output voltage 34 $U_{out}$ (cf. the representation according to FIG. 3). From the representation according to FIG. 2, it can be seen that the measurement coils—of which there are four in this exemplary embodiment—are arranged symmetrically with respect to one another. In FIG. 2, the measurement coils 24, 26, 28, 30 are respectively positioned at an angular orientation 36 of 45° with respect to one another relative to the main axes of the shaft 10. Preferably, the measurement head 16 according to the representation of FIG. 1 and the coils located thereon, i.e. the excitation coil 22 and the number of measurement coils 24, 26, 28, 30, lie at an identical distance from the shaft wall 12 of the shaft 10, whether it is a solid-material shaft 10 or a shaft which is configured as a hollow shaft.

Taking into account the size of the measurement head 16 and the number of measurement coils 24, 26, 28, 30 to be fitted symmetrically thereon, there is a minimum required diameter of the shaft 10 of about 35 mm. Because of the arrangement of the measurement coils 24, 26, 28, 30, the electrical wiring of the latter and the positioning of the measurement head 16 in relation to the shaft wall 12 of the shaft 10, only the surface stresses in the shaft wall 12 of the shaft 10 which are proportional to the torque are detected by the sensor 14.

Figure 3:
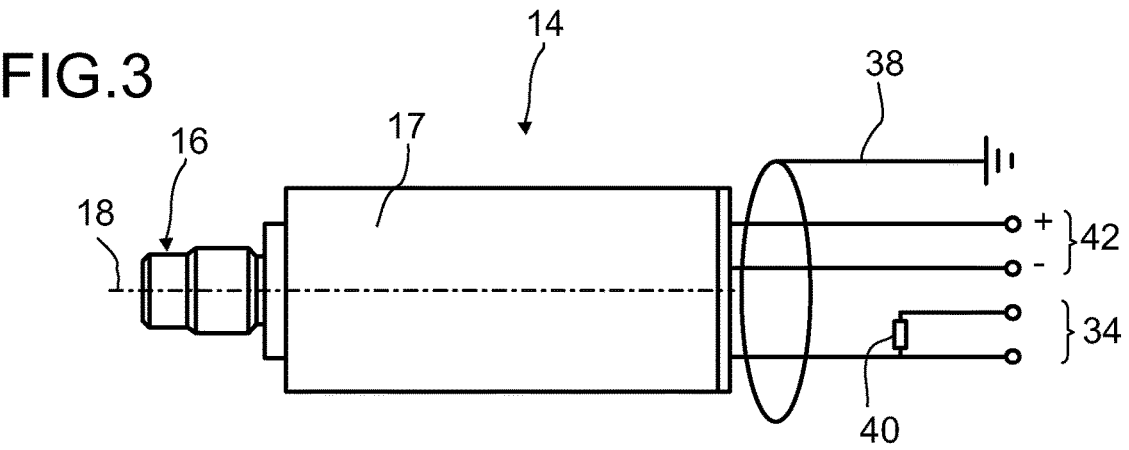
FIG. 3 shows the electrical connection of the device.

FIG. 3 shows the electrical connection of the sensor.

FIG. 3 reveals that, in the horizontal direction 18 of the sensor 14, the measurement head 16—as represented in FIG. 1—lies directly opposite the shaft wall 12 of the shaft 10. The housing 17 of the sensor 14 has a ground connection 38, as well as terminals for the supply voltage 42 $U_{DC}$ and for output lines, at which the respectively measured output voltage 34 of the set of measurement coils 24, 26, 28, 30 can be tapped. Here, a shunt resistor 40 is provided which has a resistance R of the order of 500Ω. Preferably, the connection cable for the supply voltage 42 is dimensioned in such a way that a voltage drop for the supply voltage 42 of the sensor 14 is not more than 2%

Figure 4:
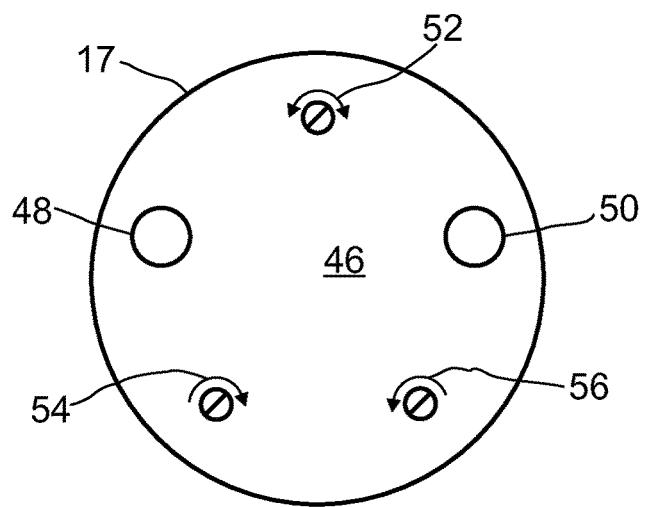
FIG. 4 shows the rear side of the device and adjustment elements.

FIG. 4 shows the rear side of the sensor.

Position 46 denotes a rear side of the sensor housing 17. The rear side 46 of the sensor housing 17 has a socket 48 and a cable input 50. Calibration of the sensor 14 can be carried out at a zero point adjustment 52. The adjustment of a gain factor or a reduction factor can be carried out at an adjustment device 54, in which case the following steps may be available: 0.312/0.625/1.25/2.5/5 and 10. A frequency adjustment can be carried out at a frequency adjustment 56, starting from 1 Hz to 5 Hz, 10 Hz, 50 Hz, 100 Hz and 200 Hz.

Figure 5:
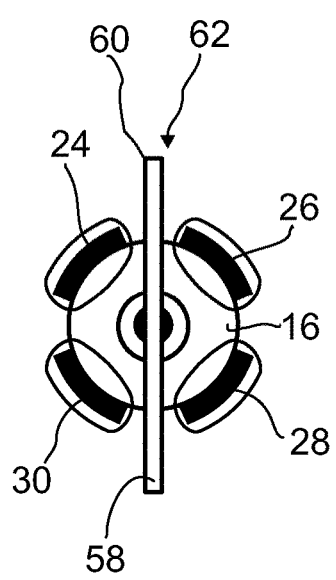
FIGS. 5-7 show calibration of the device.
Figure 6:
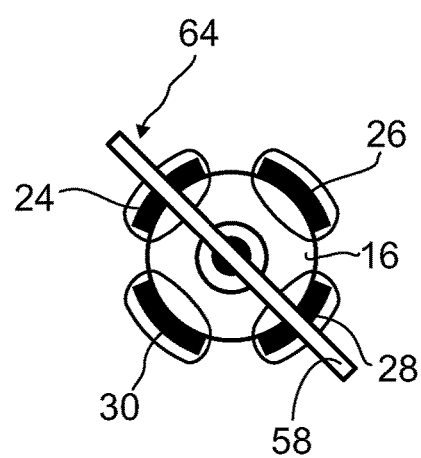
Figure 7:
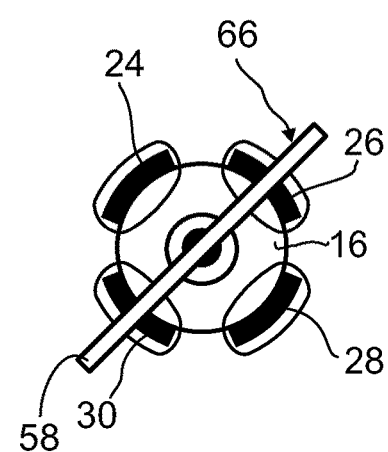

The figure sequence of FIGS. 5, 6 and 7 shows a possibility for determination of the measurement segments.

The representation according to FIGS. 5, 6 and 7 reveals that the position of the measurement coils 24, 26, 28, 30 can be determined by using a metal sheet 58 which has a thickness 60. The sheet thickness 60 of the metal sheet 58 is preferably of the order of 2 mm. The adjustment of the zero point of the sensor 14 is carried out, for example, at 12 mA. Because of the metal sheet 58, which is to be positioned in front of the measurement head 16 of the sensor 14, and rotation thereof—compare Position 6 with a 45° rotation 64 to the left or compare FIG. 7 with a 45° rotation 66 to the right—there is respectively an excursion. In the vertical position of the metal sheet 58 according to FIG. 5, there is no excursion, which means that the offset current of for example 12 mA is measured. For the position represented in FIG. 6 with a 45° rotation 64 to the left, there is a positive maximum value, and for the 45° rotation 66 of the metal sheet 58 to the right as represented in FIG. 7 there is a negative maximum value. The function of the sensor, as well as the direction of a current change, can be sampled by moving the metal sheet 58.

Figure 8:
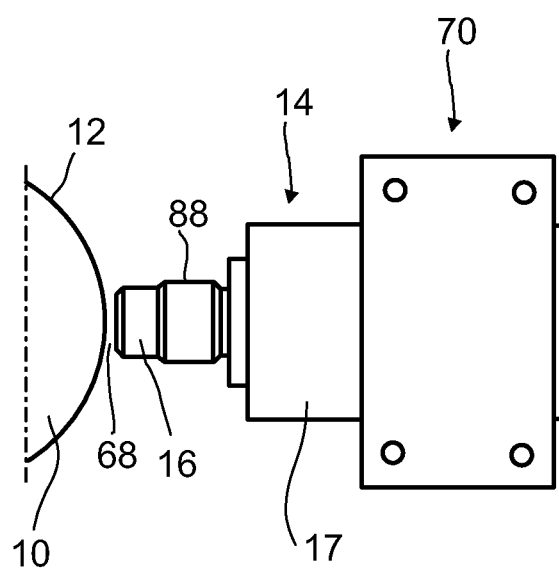
FIGS. 8 and 9 show a first sensor holder.
Figure 9:
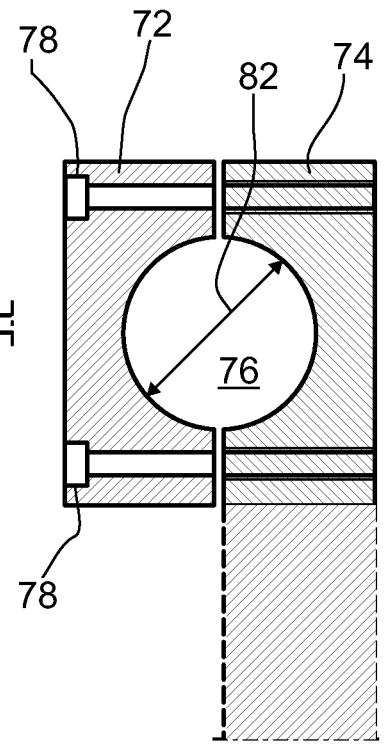

FIGS. 8 and 9 show a first sensor holder for the sensor.

FIG. 8 shows that the housing 17 of the sensor 14 is enclosed by the first sensor holder 70. From the representation according to FIG. 8, it can furthermore be seen that the measurement head 16 extending away from the housing 17 of the sensor 14 lies at the distance 68 relative to the shaft wall 12 of the shaft 10. The distance 68 preferably lies between 0.5 mm and 1 mm, and is particularly preferably 0.75 mm. On the rear side 46 of the housing 17, there is the aforementioned cable input 50.

FIG. 9 shows that the first sensor holder 70 has a first holder half 72 and a second holder half 74. In the mounted state, these delimit a through-opening 76 which may be configured with an opening diameter 82. One of the two holder halves 72, 74 comprises recesses 78 for clamping screws, with which the holder halves 72, 74 enclose the housing 17 of the sensor 14.

Figure 10:
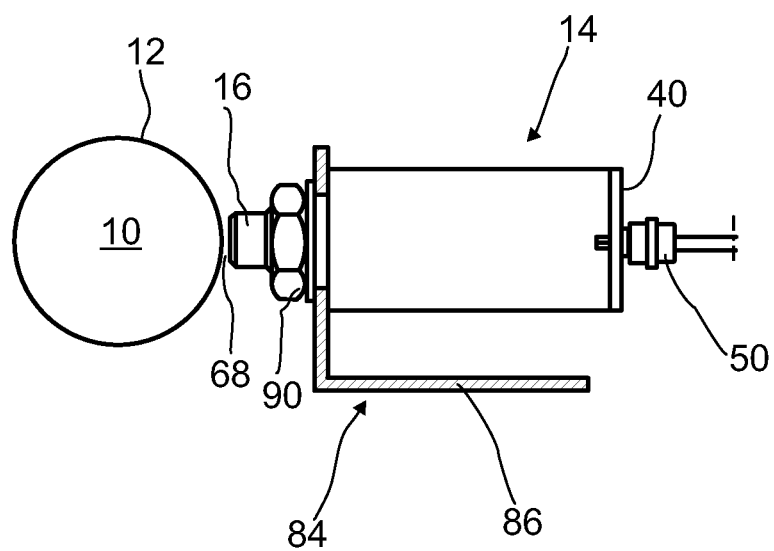
FIG. 10 shows the possible embodiment of a second sensor holder.

FIG. 10 shows a second sensor holder.

The representation according to FIG. 10 reveals that the second sensor holder 84—configured as an angle plate 86—can be fastened on the housing 17 of the sensor 14 by means of a nut 90, which is screwed onto a screw thread 88. The screw thread 88—compare also the representation according to FIG. 8—is located on the outer wall surface of the measurement head 16 of the sensor 14. By the nut 70, one end of the angle plate 86 is set against the housing 17 of the sensor 14. It is also shown in the representation according to FIG. 10 that the end side of the measurement head 16 lies at the distance 68 from the shaft wall 12 of the shaft 10, which either is made of ferromagnetic material or contains such a material. The aforementioned cable input 50 is located on the rear side 46 of the housing 17 of the sensor 14.

In relation to the calibration of the sensor 14, it should be noted that the best possible measurement results are obtained as soon as the sensor 14 is at its operating temperature. In order to obtain measurement values in the entire spectrum to be expected, the gain factor is to be selected suitably at the corresponding adjustment 54. The adjustment of a filter frequency of the sensor 14 is dictated primarily by the measurement task. The frequency adjustment 56, which—compare the representation according to FIG. 4—is located on the rear side 46 of the sensor 14, is used in order to adjust the cut-off frequency. In order to detect torques contactlessly in both directions, an offset should as far as possible lie in the middle of the measurement range (12 mA, or 6 V input voltage, with a resistance 40 of 500Ω). Preferably, the precise determination of the offset is carried out for the rotation speed of the shaft 10 under no load, in order to take into account the influence of material inhomogeneities contained therein. The sensor 14 always delivers as the output signal a current which lies between 4 mA and 20 mA. When using a shunt resistor 40 with a resistance R=500Ω, output voltages of between 2 V and 10 V are obtained. These need to be converted in order to determine the torques. The following relationship applies in the measurement range of the sensor 14: moment=FAKT (voltage minus offset).

In order to determine the conversion factor FAKT and the offset, two known measurement points are to be selected. An accurate determination of the offset should be carried out at the rated rotation speed of the shaft 10 in order to take the influence of material inhomogeneities accurately into account. This is best done with the shaft 10 under no load. If this is not possible, another operating point with a low load and a second with a high load may also be selected. The calculation of the offset is given by the formula below:

$$\text{Offset} = \frac{U_2 * M_1 - U_1 * M_2}{M_1 - M_2}$$

Here, $M_1$ is the high load with the sensor voltage $U_1$ measured therefor and $M_2$ is the low load with the sensor voltage $M_2$. In order to determine the gain factor of the sensor 14, a load point as close as possible to the rated load is required. The factor FAKT is then given as:

$$FAKT = \frac{(M_1 - M_2)}{U_1 - U_2}$$

LIST OF REFERENCES 10 shaft
12 shaft wall
14 device, sensor
16 measurement head
17 housing
18 horizontal direction
20 mounting position of the device 14
22 excitation coil
24 first measurement coil $L_1$
26 second measurement coil $L_2$
28 third measurement coil $L_3$
30 fourth measurement coil $L_4$
32 input voltage $U_{in}$
34 output voltage $U_{out}$
36 angle orientation (45°)
38 connection to ground
40 shunt resistor (R=500Ω)
42 supply voltage $U_{DC}$
44 signal current 4 mA-20 mA
46 rear side of sensor housing
48 socket
50 cable input
52 zero point adjustment 54 gain/reduction adjustment
56 frequency adjustment
58 calibration sheet
60 sheet thickness d
62 90° position
64 45° rotation to the left
66 45° rotation to the right
68 distance
70 first sensor holder
72 first sensor holder half
74 second sensor holder half
76 through-opening
78 recess for screw head
80 holder opening
82 opening width, opening diameter
84 second sensor holder
86 angle plate
88 screw thread
90 nut

The invention claimed is:

1. A device for the contactless detection of a torque of a shaft and/or of torsional natural frequencies and/or of torsional oscillations, the shaft containing a ferromagnetic material, wherein a measurement head facing toward a shaft wall of the shaft comprises an excitation coil which couples a magnetic field into the shaft, and the measurement head contains a number of measurement coils, which measure a magnetic field emerging from the shaft the measurement head is made of PEEK, the measurement head is arranged at a distance from the shaft wall, the distance lies between 0.5 mm and 1 mm.

2. The device according to claim 1, wherein the measurement coils are arranged symmetrically with respect to one another.

3. The device according to claim 2, wherein the measurement coils are arranged at an angle of 45° relative to the main axes of the shaft.

4. The device according to claim 1, wherein an excitation frequency of the excitation coil lies between 50 kHz and 150 kHz.

5. The device according to claim 4, wherein the excitation frequency of the excitation coil lies between 75 kHz and 125 kHz.

6. The device according to claim 5, wherein the excitation frequency of the excitation coil is about 100 kHz.

7. The device according to claim 1, wherein a distance of all measurement coils contained in the measurement head relative to the excitation coil is equal.

8. A method for the contactless detection of torques of a shaft and/or of torsional natural frequencies and/or of torsional oscillations comprising use of a device according to claim 1, wherein
   a) an excitation coil of the device couples a magnetic field into the shaft,
   b) a number of measurement coils measure a magnetic field emerging from the shaft,
   c) a sum of all voltages at the measurement coils is measured and
   d) the device for the detection of torques and/or torsional natural frequencies and/or torsional oscillations is calibrated by stationary measurements at two known load points.

9. The method according to claim 8, wherein the direction of a detected torque is determined from the sign of the voltage differences between the number of measurement coils.

10. The method according to claim 8, wherein surface stresses, proportional to the torque, in a shaft wall of the shaft are measured.

11. The method according to claim 8, wherein the frequency and strength of the magnetic field coupled in by the excitation coil allow a linear measurement signal over a frequency range of from 80 kHz to 120 kHz.

12. The method according to claim 8, wherein an electric current of between 4 mA and 20 mA is generated as the measurement signal.

13. The method according to claim 8, wherein the excitation coil is operated with a supply voltage of 24 volts.

14. The device according to claim 1, wherein the measurement head is arranged at a distance from the shaft wall of 0.75 mm.

* * * * *